United States Patent
Scheps

(10) Patent No.: US 6,963,354 B1
(45) Date of Patent: Nov. 8, 2005

(54) HIGH RESOLUTION IMAGING LIDAR FOR DETECTING SUBMERGED OBJECTS

(75) Inventor: Richard Scheps, Del Mar, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 466 days.

(21) Appl. No.: 08/908,778

(22) Filed: Aug. 7, 1997

(51) Int. Cl.$^7$ .................................................. H04N 7/00
(52) U.S. Cl. ............................ 348/31; 356/5.01; 359/10
(58) Field of Search .................... 348/31, 113, 81–82, 348/114, 67; 356/3.03, 5.01, 4.01, 141.4, 141.5; 372/22–23, 109, 94; 359/10, 27, 330

(56) References Cited

U.S. PATENT DOCUMENTS

| | | | |
|---|---|---|---|
| 4,143,400 A | | 3/1979 | Heckman, Jr. et al. |
| 4,359,640 A | | 11/1982 | Geiger |
| 4,862,257 A | | 8/1989 | Ulich |
| 4,920,412 A | | 4/1990 | Gerdt et al. |
| 4,964,721 A | * | 10/1990 | Ulich et al. .................... 348/31 |
| 5,034,810 A | | 7/1991 | Keeler |
| 5,082,362 A | * | 1/1992 | Schneiter .................... 356/3.03 |
| 5,084,776 A | | 1/1992 | Watson |
| 5,091,778 A | | 2/1992 | Keeler |
| 5,117,126 A | * | 5/1992 | Geiger ......................... 359/330 |
| 5,164,823 A | | 11/1992 | Keeler |
| 5,181,135 A | | 1/1993 | Keeler |
| 5,181,212 A | * | 1/1993 | Moberg ......................... 372/22 |
| 5,198,915 A | | 3/1993 | Watson |
| 5,231,401 A | | 7/1993 | Kaman et al. |
| 5,241,314 A | | 8/1993 | Keeler et al. |
| 5,270,780 A | | 12/1993 | Moran et al. |
| 5,276,632 A | | 1/1994 | Corwin et al. |
| 5,343,284 A | | 8/1994 | Keeler et al. |
| 5,371,358 A | | 12/1994 | Chang et al. |
| 5,442,358 A | | 8/1995 | Keeler |
| 5,446,529 A | | 8/1995 | Stettner et al. |
| 5,457,639 A | * | 10/1995 | Ulich et al. .................... 356/5.1 |
| 5,506,616 A | * | 4/1996 | Scheps ......................... 348/31 |
| 5,530,711 A | | 6/1996 | Scheps |
| 5,822,047 A | * | 10/1998 | Contarino et al. ......... 356/5.01 |

* cited by examiner

*Primary Examiner*—Gims Philippe
(74) *Attorney, Agent, or Firm*—Andrew J. Cameron; Michael A. Kagan; Peter A. Lipovsky

(57) ABSTRACT

An image lidar includes a laser for generating light beam pulses in a line scan to illuminate an area surrounding a target. A controller selects pulse width and pulse rate of the light beam pulses emitted by the laser. A photomultiplier tube detects energy from the light beam pulses scattered by the target and generates a series of pixels defined by the light beam pulses and the line scan. A display generates an image from the pixels that is representative of the target.

2 Claims, 1 Drawing Sheet

HIGH RESOLUTION IMAGING LIDAR FOR DETECTING SUBMERGED OBJECTS

BACKGROUND OF THE INVENTION

The present invention relates to the detection of submerged objects in a scattering medium such as water. More specifically, but without limitation thereto, the present invention relates to a device for forming high resolution images of objects submerged in shallow water and coastal regions from an airborne platform using improved lidar (light detection and ranging, analogous to radar, i.e., radio detection and ranging) to provide high resolution imaging.

A number of military and civilian applications require searching for certain objects in a scattering medium. For example, moored and bottom mines deployed in shipping lanes generally must be detected before measures can be taken to disarm them. It is also useful in various applications to locate and map submerged obstacles, cables, pipelines, barrels, oil drums, etc.

An imaging lidar is commonly applied to the problem of detecting submerged objects in shallow water, such as mines. An exemplary lidar is described in U.S. Pat. No. 5,243,541 issued to Ulich on Sep. 7, 1993 incorporated herein by reference thereto. This lidar improves the spatial resolution of objects by pulsing the laser and range gating the photodetector to exclude scattered light from the surface and depths not of interest.

Line scanning is another image acquisition technique that is typically used with a laser on a moving submerged platform. The laser scans the ocean bottom transversely with respect to the direction of motion of the platform and images the scattered light with a narrow field of view photomultiplier tube. In order to generate an image at a practical resolution, the scan rate should be about 700,000 pixels per second. A slower scan rate would increase the data acquisition time, causing vulnerability in hostile environments, or reduce the image resolution.

A problem with current scanning lidars is that they perform poorly in ambient light. Because blue-green lasers are typically used for underwater transmission, sunlight scattered back to the photomultiplier tube degrades the signal to noise ratio. Another problem is that surface scattering dictates that the laser/detector platform be submerged to prevent heavy losses in the transmitted signal. Still another problem is that a 700 KHz scan rate dictates the use of CW lasers, because most lasers cannot be pulsed at rates on the order of 700 KHz without significantly degrading the laser efficiency, which prevents locating the laser/detector platform on an aircraft for use above the water surface.

SUMMARY OF THE INVENTION

An imaging lidar of the present invention is directed to overcoming the problems described above, and may provide further related advantages. No embodiment of the present invention described herein should be construed to preclude other embodiments or advantages that may exist or become obvious to those skilled in the art.

An imaging lidar of the present invention comprises a laser for generating a line scan of light beam pulses to illuminate an area surrounding a target. An image acquisition controller selects pulse width and pulse rate of the light beam pulses emitted by the laser. A photomultiplier tube detects energy from the light beam pulses scattered by the target and generates an output signal comprising a series of pixels defined by the light beam pulses. A display generates an image from the output signal that is representative of the target. The photomultiplier tube output signal may be gated to block light scattered from ranges other than a selected range window for the target, such as from a water surface.

An advantage of the imaging lidar of the present invention is that the scanning beam may be pulsed at a rate sufficient for high data acquisition rates used in high resolution imaging applications and at a high energy efficiency suitable for airborne platforms.

Another advantage is that the signal-to-noise ratio may be substantially improved relative to current line scanning systems using a CW laser by gating the received pulse to exclude most of the ambient sunlight and surface scattered light reaching the scanning beam detector.

Yet another advantage is that the range of objects in the scanned image may be determined with high resolution for contour mapping applications.

The features and advantages summarized above in addition to other aspects of the present invention will become more apparent from the description accompanied by the following drawings.

DESCRIPTION OF THE INVENTION

Figure 1:
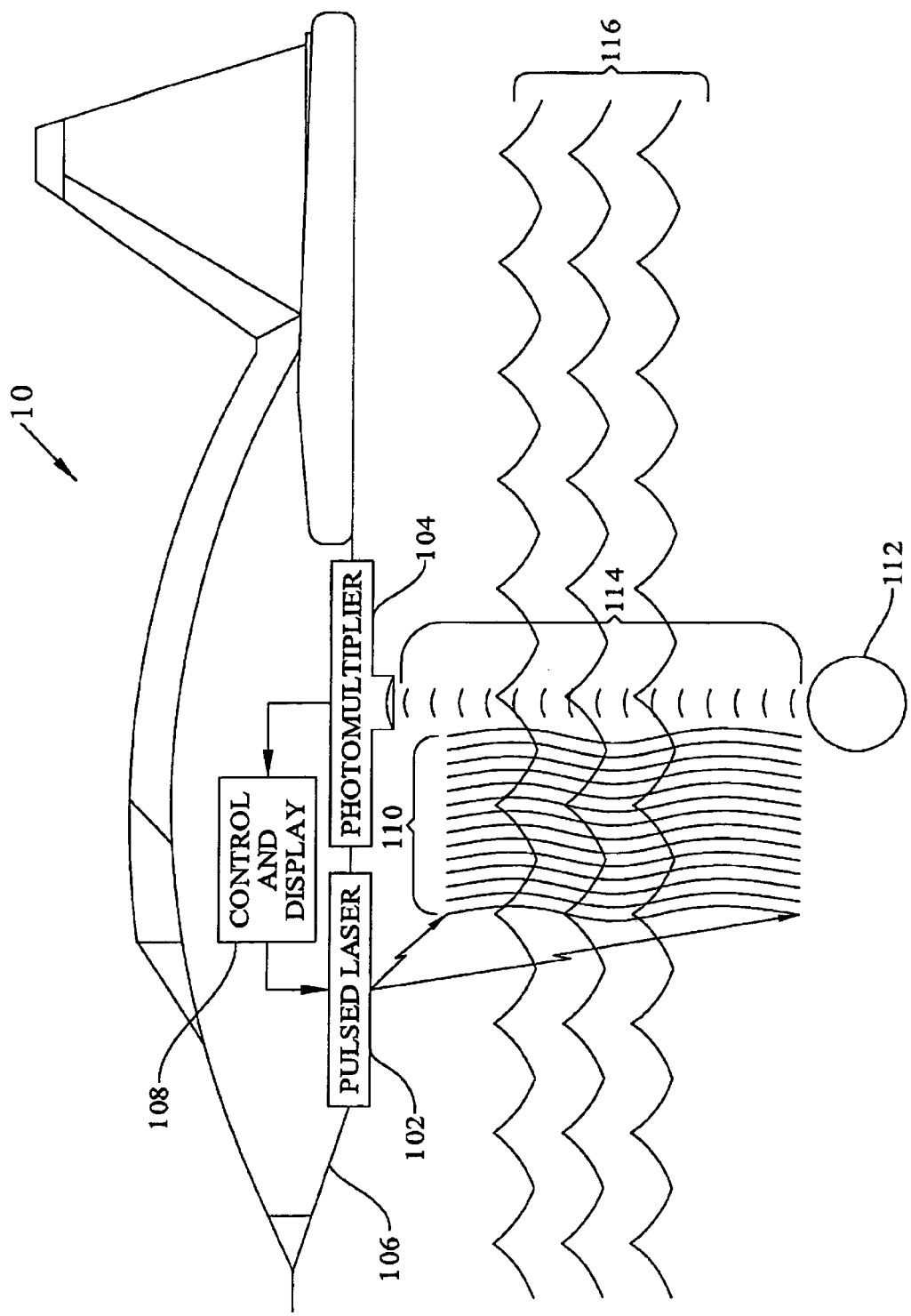
FIG. 1 is diagram of an imaging lidar of the present invention on an airborne platform.

The following description is presented solely for the purpose of disclosing how the present invention may be made and used. The scope of the invention is defined by the claims.

In FIG. 1 an imaging lidar system 10 of the present invention comprises a pulsed laser 102, a photomultiplier 104, and a control/display 108. An aircraft 106, by way of example, may be used to provide relative motion of the lidar components over water surface 116. Pulsed laser 102 may be made as in U.S. Pat. No. 5,530,711 issued to Richard Scheps on Jun. 25, 1996 incorporated herein by reference thereto and configured with photomultiplier 104 and control/display 108 as described in U.S. Pat. No. 4,143,400 issued to Paul Heckman et al. on Mar. 6, 1979 incorporated herein by reference thereto.

In operation pulsed laser 102 emits pulses in, for example, the blue-green wavelength region for optimum transmission in water at a rate of, for example, 700 KHz to match the data acquisition rate of typical CW lidar systems. This is possible due to the short flourescence lifetime of the dye gain medium. The pulses may be scanned transversely with respect to the direction of relative motion to generate scan lines 110 as shown in FIG. 1. Light pulses 114 scattered by a target object 112 are detected by photomultiplier 104. The combined advantages of line scanning and temporal discrimination for image acquisition with reduced backscatter are made possible by using a laser diode pumped dye laser for pulsed laser 102 to achieve high power efficiency, high repetition rate, and short pulse width due to the short decay time of dye lasers. Rather than using an optical shutter to generate pulses from a CW laser, the present invention switches the laser pump diode(s) of pulsed laser 102 on and off at the pulse rate so that all of the available power of the dye laser is used in the pulse.

Line scan reduces the backscattered return signal by spatial discrimination, and in the present invention the output signal from photomultiplier 104 is gated to further reduce the backscattered return signal by temporal discriminination. For example, using a 5 ns pulse width at a pulse rate of 700 KHz results in a duty cycle of about 0.0035, i.e., only about 0.35% of the ambient light is added to the signal from light pulses 114. The range detection window may be selected by varying the delay between the pulse transmission time and the gating interval. The range resolution along the path of the scanning beam is substantially equal to the pulse length. A pulse width of 5 ns results in a pulse length of about four feet. Each pulse defines a single pixel in the beam scan. The range resolution may be further improved by shortening the control pulse to pulse laser 102. The output of photomultiplier 104 is input to control/display 104. Control/display 104 provides pulsing signals to pulsed laser 102 and generates a pixel by pixel raster scan display from light pulses 114 scattered from the output of photomultiplier 104 that shows the dimensions of target 112.

Alternatively, a periodically poled crystal may be used as a frequency multiplying gain element to obtain shorter output wavelengths from a laser pumped by a laser diode.

Other modifications, variations, and applications of the present invention may be made in accordance with the above teachings other than as specifically described to practice the invention within the scope of the following claims.

I claim:

1. An imaging lidar comprising:

a pulsed laser for generating at a pulse rate a sequence of light beam pulses each having a pulse width;

a spatial discriminator coupled to the pulsed laser for steering the light beam pulse sequence in a plurality of line scans describing an area surrounding a target, each said line scan including a plurality of said light beam pulses;

a photomultiplier tube for detecting energy from said light beam pulses scattered by said target and for generating an output signal representative of said scattered light beam pulse energy;

an image acquisition controller coupled to said pulsed laser and to said photomultiplier tube for selecting said pulse width and said pulse rate of said light beam pulses and for generating a display signal from said output signal of said photomultiplier tube; and a display coupled to said controller for generating an image from said display signal representative of said target; wherein said pulse rate greater than 600 KHz.

2. An imaging lidar comprising:

a pulsed laser for generating at a pulse rate a sequence of light beam pulses each having a pulse width;

a spatial discriminator coupled to the pulsed laser for steering the light beam pulse sequence in a plurality of line scans describing an area surrounding a target, each said line scan including a plurality of said light beam pulses;

a photomultiplier tube for detecting energy from said light beam pulses scattered by said target and for generating an output signal representative of said scattered light beam pulse energy;

an image acquisition controller coupled to said pulsed laser and to said photomultiplier tube for selecting said pulse width and said pulse rate of said light beam pulses and for generating a display signal from said output signal of said photomultiplier tube;

and a display coupled to said controller for generating an image from said display signal representative of said target;

wherein said laser comprises a periodically poled crystal gain element for generating a laser output having a frequency that is a multiple of a pumping frequency.

* * * * *